United States Patent [19]

Yamaguchi et al.

[11] 4,185,727
[45] Jan. 29, 1980

[54] WHEEL HUB CLUTCHING MECHANISM

[75] Inventors: Hiroji Yamaguchi, Kariya; Kikuo Kato, Chita; Tooru Kagata, Toyota, all of Japan

[73] Assignee: Aisin Seiki Kabushiki Kaisha, Aichi, Japan

[21] Appl. No.: 837,265

[22] Filed: Sep. 27, 1977

Related U.S. Application Data

[63] Continuation of Ser. No. 641,816, Dec. 18, 1975, abandoned.

[30] Foreign Application Priority Data

Dec. 27, 1974 [JP] Japan .................................. 50-1790

[51] Int. Cl.² .......................... F16D 11/04; F16D 1/06
[52] U.S. Cl. ............................ 192/89 B; 192/109 A; 192/110 B; 403/1
[58] Field of Search ............... 192/67 R, 89 A, 110 B, 192/91 A, 109 A; 403/1

[56] References Cited

U.S. PATENT DOCUMENTS

| | | | |
|---|---|---|---|
| 2,948,557 | 8/1960 | Howe et al. | 192/67 R |
| 3,123,169 | 3/1964 | Young et al. | 192/67 R X |
| 3,442,361 | 5/1969 | Hegar | 192/67 R |
| 3,669,476 | 6/1972 | Wilson | 192/109 A |
| 3,718,213 | 2/1973 | Hegar et al. | 192/109 A |
| 3,753,479 | 8/1973 | Williams | 192/89 A |
| 4,007,820 | 2/1977 | Kagata | 192/89 A |

*Primary Examiner*—Benjamin Wyche
*Attorney, Agent, or Firm*—Oblon, Fisher, Spivak, McClelland & Maier

[57] ABSTRACT

A wheel hub clutching mechanism includes an internally splined body, and a clutch ring which is adapted to be meshed with a shaft driven pinion and is resiliently connected by means of a connecting spring to a follower which, in turn, is controlled by means of a rotatable cam. The follower and the clutch ring are biased toward the locked positions thereof by means of a compression spring when the cam is rotated to its locked position by means of a manually operated handle, and the clutch ring is retracted to the free position thereof together with the follower when the cam is rotated to its free position by means of the handle. A pinion supporting member is also interposed between the shaft driven pinion and the body, the splines of the body being formed so as to be substantially parallel to the shaft axis.

9 Claims, 5 Drawing Figures

WHEEL HUB CLUTCHING MECHANISM

This is a continuation of application Ser. No. 641,816, filed Dec. 18, 1975, and now abandoned.

BACKGROUND OF THE INVENTION

1. Field of the Invention

The present invention relates generally to a wheel hub clutching mechanism, and more particularly to an improved wheel hub clutching mechanism which is adapted to couple and uncouple a front wheel hub to and from a driven front axle in order to selectively provide four-wheel or two-wheel drive.

2. Description of the Prior Art

A wheel hub clutching mechanism normally includes a body, which is provided along its inner periphery with spline slots, and a pinion which is secured upon the driven front axle and which is provided along its outer periphery with splines so as to be enmeshed with a clutch ring. It is necessary to provide a draft within the spline slots of the body due to the fact that the same is formed through means of die-casting since the conventional clutching mechanism is provided with a bearing portion which is integrally formed with the body for supporting the pinion.

As a result, according to such conventional mechanisms, when the outer splines of the clutch ring are enmeshed with the internal spline slots of the body in order to transmit torque therebetween, the body is inclined, due to the draft, with respect to the clutch ring. The clutch ring, which, for example, may be made of iron steel, may therefore not be fully engaged with the entire portion of the spline slots of the body, which, may for example, be made of aluminum, that is, the clutch ring may be obliged to locally engage only one portion of the body spline slots upon torque transmission, thereby resulting in the incomplete torque transmission or insufficient strength being developed by means of the spline slots of the body.

SUMMARY OF THE INVENTION

Accordingly, it is an object of the present invention to provide a wheel hub clutching mechanism wherein the spline slots of the body may be formed substantially parallel to the front shaft axis by means of broaching or any other appropriate process or means, so as to overcome the conventional drawbacks characteristic of the local engagement of the clutch ring with the spline slots of the body.

Another object of the present invention is to provide a wheel hub clutching mechanism wherein there is no need to provide the draft within the body, and consequently the strength of the body may be increased.

According to the present invention, it is possible to manufacture the body of iron steel in lieu of aluminum.

BRIEF DESCRIPTION OF THE DRAWINGS

Various other objects, features, and attendant advantages of the present invention will be more fully appreciated as the same become better understood from the following detailed description when considered in connection with the accompanying drawings, in which like reference characters designate like or corresponding parts throughout the several views, and wherein.

BRIEF DESCRIPTION OF THE ILLUSTRATED EMBODIMENTS

Figure 2:
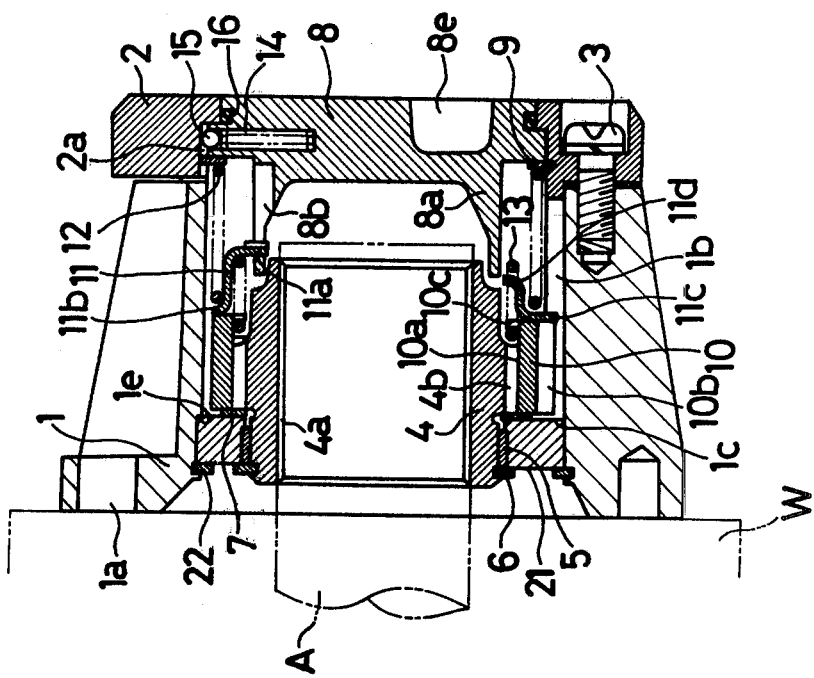
FIG. 2 is a cross-sectional view of the mechanism of FIG. 1 taken along the line II—II of FIG. 1, with the parts thereof positioned in the clutch engaging condition.
Figure 1:
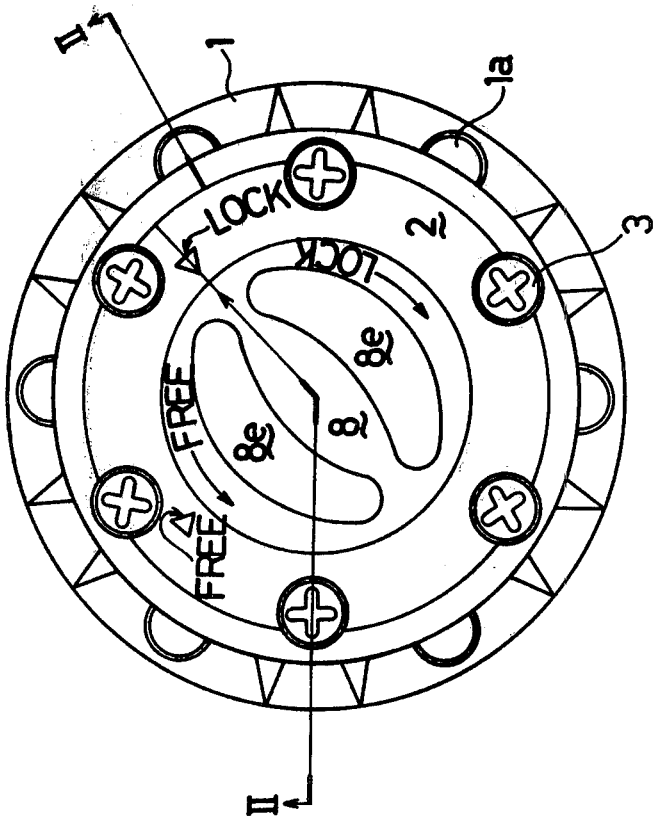
FIG. 1 is a front elevation view of a wheel hub clutching mechanism constructed in accordance with the present invention.

Referring now to the drawings, and more particularly to FIGS. 1-4 thereof, there is illustrated a first embodiment of a wheel hub clutching mechanism constructed in accordance with the present invention which comprises an annular body 1, secured to a front wheel hub W of a vehicle by means of a plurality of threaded bolts, not shown, disposed within holes 1a, and an annular cover 2 fixed to the outer end of the body 1 by means of screws 3. The body 1 is provided with internal splines 1b which are formed by means of broaching so as to be disposed parallel to a driven front wheel axle A, and an annular pinion 4, fitted to a splined end portion of the front axle A of the vehicle and including external splines 4b, is adapted to be meshed with a clutch ring 10.

The internal splines 1b of body 1 are formed at one end thereof with a shoulder 1c for limiting the axial movement of a supporting member 21, and the supporting member 21 is adapted to be enmeshed with the internal splines 1b of the body 1 whereby the rotational movement thereof is likewise limited and prevented. As noted, the axial movement, in one direction, of the supporting member 21 is prevented by means of the shoulders 1c of splines 1b, and a ring member 22 is fixed to the body 1 so as to prevent similar movement of member 21 in the opposite direction.

An annular bushing 5 is pressed into the inner peripheral surface of the supporting member 21 so as to provide a bearing means for the pinion 4, and snap rings 6 and spacer ring 7 are secured to axially inner and outer portions of the pinion 4 in order that the axial movement of the pinion 4, with respect to the body 1, is prevented through means of the supporting member 21. It should be noted that the body 1 is also provided with a shoulder 1e upon its inner periphery so as to similarly limit the axial movement of the supporting member 21 in cooperation with the shoulders 1c of splines 1b. As a result of this arrangement, pinion 4 is rotatably mounted within the supporting member 21, through means of the metal bushing 5, and is maintained within its position by means of the annular snap rings 6 and spacer ring 7 fixed to the pinion 4.

A manually controlled handle 8 is rotatably mounted within a stepped bore of annular cover 2 and is axially supported therein by means of a snap ring 9, fixed to the inner periphery of cover 2, which prevents axial movement of the handle 8, an O-ring oil seal 16, interposed between the outer periphery of the handle 8 and the inner periphery of the small diameter portion of the stepped bore, being provided to render the interior portion of the body 1 water-tight. Arcuate finger grip recesses 8e are provided within the outer face of the handle 8 for manually turning the same between a locked position and a free position, and a detent ball 15, biased by means of compressed coil spring 14, is deposited within notches 2a when the handle 8 is in either the free position or the locked position, an arrow not numbered, provided upon the face of the handle 8, being aligned with triangular indication marks for indicating the free position or the locked position.

Figure 4:
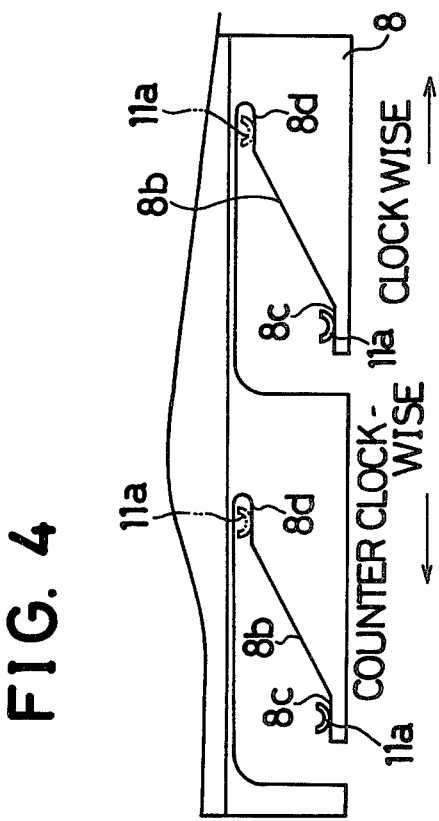
FIG. 4 is a schematic view of the cam portion of the clutching mechanism and part of the associated follower.

The handle 8 has a cylindrical, axially extending boss 8a upon which two cam portions 8b are provided for guiding a pair of opposed follower tabs 11a formed upon an annular follower ring 11, and as shown within FIG. 4, the cam portions 8b are respectively provided with two flat engaging faces 8c and 8d for supporting the follower tab 11a of the follower ring 11 thereon in either the free position or the locked position of the handle 8. The follower ring 11 has four spline-type lugs 11c which are extended radially from an outer flange 11b of the follower ring 11, and the spline lugs 11c are adapted to be guided with the internal spline slots 1b of the body 1 whereby turning of the handle 8 from its free position to its locked position permits a compression spring 12 to bias the follower ring 11 and the clutch ring 10 from the free positions thereof, shown within FIG. 3, to the locked positions thereof shown within FIG. 2.

The compression spring 12 is interposed between the snap ring 9 fixed to cover 2 and the outer flange 11b of follower ring 11 so as to constantly bias the clutch ring 10, through means of the follower ring 11, axially inwardly, and the follower ring 11 and the clutch ring 10 are seen to be resiliently connected to each other by means of a coil spring 13 which is engaged at one end thereof with a pair of opposed hooks 11d which extend radially from the follower ring 11 and at the other end thereof with a radially projecting hook portion 10c formed upon the clutch ring 10. The clutch ring 10 has an external spline 10b which is adapted to be guided within the internal spline slots 1b of body 1 and an internal spline 10a which is adapted to be enmeshed with the external spline teeth 4b of pinion 4.

Figure 3:
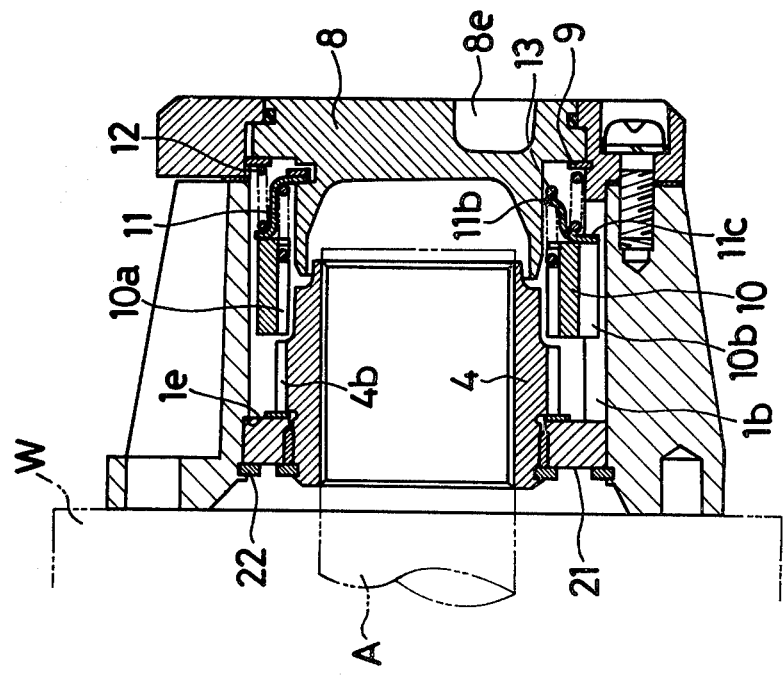
FIG. 3 is a view similar to that of FIG. 2, showing however the parts positioned in the clutch disengaging condition.

In order to uncouple the front wheel hub from the front axle so as to provide two-wheel drive for the vehicle, the handle 8 is manually rotated in the counter-clockwise direction from its locked position to its free position whereby the corresponding rotation of cam portions 8b retracts the tabs 11a of follower ring 11 so as to bias the spring 12 to its compressed condition as shown within FIG. 3. This causes the follower ring 11 to pull the clutch ring 10, by means of the connecting spring 13, out of engagement with the pinion 4, and thus, the clutch ring 10 is disengaged from pinion 4 so as to free the front wheel hub, as shown within FIG. 3. In the instance that any preloading causes friction to be developed between the internal spline teeth 10a of clutch ring 10 and the external spline teeth 4b of pinion 4, the connecting coil spring 13 will be stretched by means of the hooks 11d of follower ring 11 until the preloading is overcome, and therefore, as the pinion 4 is rotated a slight amount, the connecting spring 13, having been stretched, pulls the clutch ring 10 so as to permit disengagement of the same from pinion 4.

In order to couple the front wheel hub with the front axle so as to provide four-wheel drive of the vehicle, the handle 8 is manually rotated in the clockwise direction from its free position to its locked position whereby the corresponding rotation of the cam portions 8b permits the compression spring 12, which has been in a state of compression, to push the follower ring 11 and clutch ring 10 from the free positions thereof to the locked positions thereof so as to engage clutch ring 10 with pinion 4. In this instance, if the clutch ring 10 and pinion 4 do not initially mesh, the spring 12 will push the clutch ring 10 into engagement with the pinion 4 as the pinion 4 is rotated a slight amount and will maintain the engagement between pinion 4 and clutch ring 10.

Figure 5:
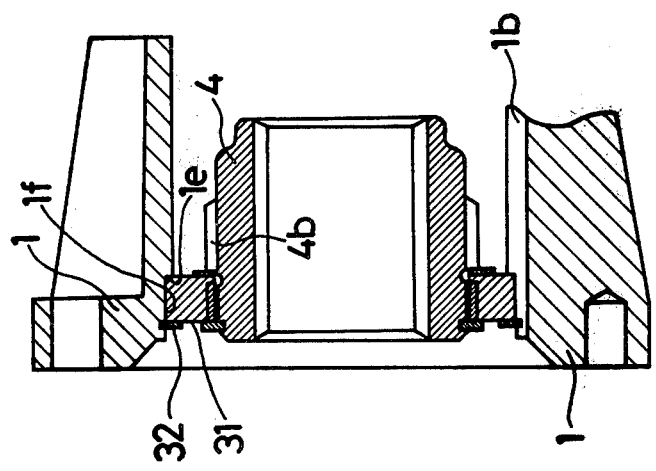
FIG. 5 is a modification of the wheel hub clutching mechanism of FIGS. 1-4 with some parts removed for convenience of illustration.

Referring now to FIG. 5, wherein a modified embodiment of the present invention is shown, a supporting member 31 is formed so as to fit within an annular recess 1f of body 1 and is adapted to be pressed into recess 1f whereby rotation of the supporting member 31 is prevented. The axial movement of the supporting member 31 is similarly limited by means of a snap ring 32 secured to body 1 and the shoulder 1e of the body 1, and thus it will be apparent that the main difference between the embodiments of FIGS. 1-4 and FIG. 5 is the manner in which the rotational movement of the supporting member 31 is limited.

Obviously, many modifications and variations of the present invention are possible in light of the above teachings. It is to be understood therefore that within the scope of the appended claims, the present invention may be practiced otherwise than as specifically described herein.

What is claimed as new and desired to be secured by Letters Patent of the United States is:

1. A wheel hub clutching mechanism comprising:
    a body member, provided with internal splines adapted to be secured to a wheel hub;
    a pinion journalled within said body and adapted to be mounted upon a driven axle, and provided with external splines;
    a clutch ring splined to said body and axially movable by resilient means from a free position within which it is disengaged from said pinion to a locked position within which it is engaged with said pinion;
    a supporting member secured to said body for bearing said pinion, said supporting member being secured to said body in the rotational direction thereof and axially fitted therebetween;
    said splines of said body being disposed substantially parallel to said axle;
    said supporting member and said body being arranged so as to prevent relative rotation therebetween and such that said supporting member is a separate member from said body member;
    a first and second snap ring secured to said body and said pinion, respectively, for thereby preventing the axial movement of said supporting member;
    a metal bushing secured to the inner periphery of said supporting member for thereby bearing said pinion; and
    a follower ring splined to said body such that said clutch ring axial movement is performed in one direction by engaging said follower ring.

2. A wheel hub clutching mechanism as set forth in claim 1, wherein:
    said body is provided with an annular recess within which said supporting member is disposed so as to thereby prevent rotation of said supporting member.

3. A wheel hub clutching mechanism as set forth in claim 1 wherein:
    said body is provided with a shoulder for thereby preventing the axial movement of said supporting member in cooperation with said snap rings.

4. A wheel hub clutching mechanism as set forth in claim 1, wherein:
said body is made of aluminum and said supporting member is made of iron steel.

5. A wheel hub clutching mechanism as set forth in claim 1, wherein:
said splines extend along substantially the entire length of said body and said clutching ring includes exterior splines which engage with said splines of said body upon engagement of said clutch ring with said pinion.

6. A wheel hub clutching mechanism comprising:
a body member, provided with internal splines adapted to be secured to a wheel hub;
a pinion journalled within said body and adapted to be mounted upon a driven axle, and provided with external splines;
a clutch ring splined to said body and axially movable from a free position within which it is disengaged from said pinion to a locked position within which it is engaged with said pinion;
a first and second spring member for moving said clutch ring,
a follower ring splined to said body and disposed to interconnect said first and second spring member whereby said clutch ring axial movement is performed in one direction by engaging said follower ring; and
a supporting member secured to said body for bearing said pinion, said splines of said body being disposed substantially parallel to said axle.

7. A wheel hub clutching mechanism as set forth in claim 6, wherein:
said clutch ring axial movement is performed in a direction opposite to said one direction by engagement with said second spring member.

8. A wheel hub clutching mechanism as set forth in claim 6, wherein:
each of said first and second spring member is axially disposed adjacent one side of said clutch ring.

9. A wheel hub clutching mechanism as set forth in claim 6, wherein:
each of said first and second spring members is axially disposed adjacent one side of said clutch ring.

* * * * *